June 30, 1970 C. W. DAVID 3,517,642

APPARATUS FOR EDGING MAGNETIC DISC

Filed March 29, 1965

INVENTOR
CHARLES W. DAVID
BY Samuel Lindenberg
Abraham Wiseman
ATTORNEYS

United States Patent Office 3,517,642

Patented June 30, 1970

3,517,642

APPARATUS FOR EDGING MAGNETIC DISC

Charles W. David, Los Angeles, Calif., assignor to Data Products Corporation, Culver City, Calif., a corporation of Delaware Filed Mar. 29, 1965, Ser. No. 443,186

Int. Cl. B05b *67/00*

U.S. Cl. 118—7 1 Claim

ABSTRACT OF THE DISCLOSURE

An apparatus for edging magnetic discs includes a drive means for rotating a disc about its center. A grinding assembly is arranged to be moved into contact with the periphery of the disc to grind magnetic material therefrom. A vacuum system removes the ground off magnetic material. A nozzle is mounted adjacent the periphery of the disc for depositing a protective liquid on the periphery of the disc. A second nozzle is provided for applying a neutralizing liquid to the disc. Automatic control means are provided to control the movement of the grinding assembly and the sequence and timing of the grinding and nozzle operations.

This invention relates to an apparatus for grinding metallic discs and, more particularly, to an apparatus for edging metallic discs coated with magnetic material.

Various arrangements for storing information in materials having magnetic properties have been developed as part of the overall development of modern day computers. Magnetic cores and magnetic tapes are two well known examples of materials used for such purposes. In recent years, computing systems have been developed which utilize magnetic discs as the means for storing discrete elements of information.

A magnetic disc is similar to the well known phonograph record, except that its surface is coated with a layer of magnetic material. Information is written into, or read out of, the magnetic material by means of one or more magnetic heads in a manner similar to that performed in a conventional tape recorder. The disc itself is generally machined of metal which is precision ground and lapped to a very fine finish. Thereafter, one or both surfaces or sides of the disc are coated with the magnetic material, having desired magnetic properties. The coated material is hardened by a curing process.

During the coating operation, some of the magnetic material adheres in an irregular pattern to the periphery or edge of the disc. Such material affects ths appearance of the disc as well as its balancing properties about its center. Therefore, in the production of magnetic discs, it is necessary to grind or edge the disc about its periphery to remove undesired material which may be deposited thereat. Also, it is important to protect the metallic edge of the disc from corroding, or being adversely affected in any other manner.

Accordingly, it is an object of the present invention to provide an apparatus for controlling the characteristics of the periphery of the metallic disc.

Another object of the present invention is to provide an apparatus for automatically grinding the edge of a metallic disc on which magnetic material is deposited so as to control the peripheral characteristics thereof.

A further object of the present invention is to provide an apparatus for grinding the edge of a metallic disc and controlling the metallic characteristics of the edge thereof.

These and other objects of the present invention are achieved by providing an apparatus whereby a metallic disc is rotated about its center, and grinding means positioned in contact with the periphery of the disc so that as the disc rotates, its periphery or edge is ground to remove any magnetic material which has been deposited thereat, while the magnetic material was deposited on one or both surfaces of the disc. In addition, the apparatus also includes an arrangement whereby after all the undersired magnetic material is removed from the periphery of the disc, the metallic surface thereof is treated with a compound which reacts with the metallic material. The reaction protects the metal from corroding and other adverse effects.

After permitting the rotating disc to react with the compound for a predetermined time period, the compound is diluted by means of a neutralizing liquid such as water to stop the reaction, thereby controlling the uniformity of the metallic color of the periphery of the disc. Thus, each disc is edged to remove any undesired magnetic material which is deposited around the periphery thereof, and the metallic material is automatically protected from corrosion as well as treated to possess a uniform color.

The novel features that are considered characteristic of this invention are set forth with particularity in the appended claim. The invention itself, as well as additional objects and advantages thereof, will best be understood from the following description when read in connection with the accompanying drawings, in which:

Figure 1:
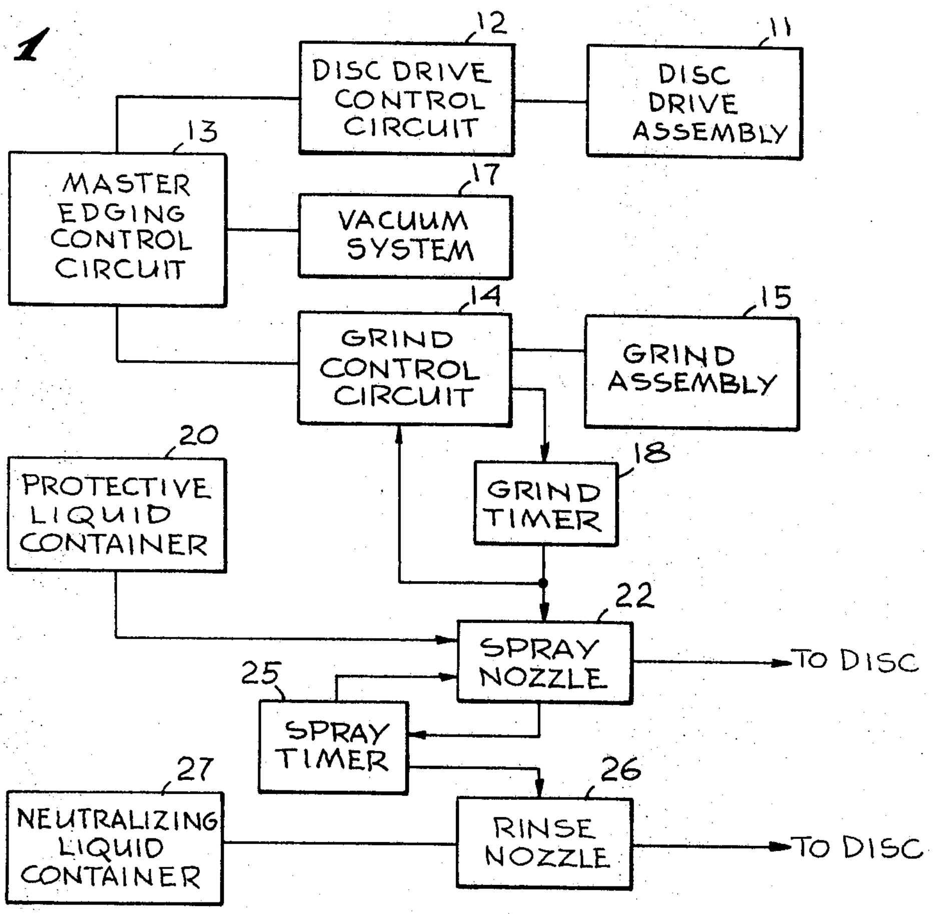
FIG. 1 is a block diagram of the apparatus of the present invention.

Reference is now made to FIG. 1 which is a block diagram of the apparatus of the present invention. The apparatus includes a disc drive assembly 11 to which a circular disc may be coupled so that when the assembly 11 is driven by a disc drive control circuit 12 which is in turn coupled to a master edging control circuit 13, the disc rotates about its center. The circuit 13 is connected through a grind control circuit 14 to a grind assembly 15 and to a vacuum system 17. In operation, the master edging control circuit 13 energizes the disc drive assembly 11 through control circuit 12 to cause the disc to rotate about its center. After a time period sufficient for the disc to reach a selected speed or rate of rotation, the master edging control circuit 13 energizes the grind assembly 15 through the grind control circuit 14, causing a grinding tool (not shown) of the assembly 15 to come in contact with the periphery of the disc so as to grind away any material deposited thereat. At the same time, the control circuit 13 energizes the vacuum system 17 to remove any material ground off the periphery or edge of the disc.

A timer 18, of the preset type, is connected to the grind control circuit 14 so that once the grinding operation starts, after a predetermined time period, a signal is supplied from the timer to the grind control circuit 14 to deenergize the grind assembly and stop the grinding of the edge of the disc. The apparatus of the present invention also includes a container 20 coupled to a nozzle 22 which is connected through the timer 18. A liquid which is capable of reacting with the metal of the disc so as to react therewith to protect the metal from corrosion, is contained in the container 20. At the end of the grinding cycle determined by the timer 18, the nozzle 22 is energized such as by means of a solenoid valve (not shown), to enable the liquid from the container to be applied to the periphery of the disc. The liquid may be poured or sprayed unto the disc, thus the term spray used hereafter should be considered in a broad sense to include other ways of applying the liquid to the disc besides actual spraying such as applying a continuous stream of liquid.

The length of time during which the protective liquid is applied to the disc is controlled by a timer 25 which is connected to the nozzle 22 so that after a preset time period, the nozzle is deenergized in order to prevent additional liquid from the container 20 from being applied to the disc. The timer 25 is also connected to a rinse nozzle 26 which is in turn connected to a container 27 wherein a neutralizing liquid, such as water, is contained. Thus, when the timer 25 deenergizes nozzle 22 to prevent additional liquid from being applied to the disc, it also energizes the rinse nozzle 26 to enable neutralizing liquid from container 27 to be applied to the disc thereby stopping the reaction between the liquid from container 20 with the metal of the disc.

From the foregoing description, it should be appreciated that the operation of edging a magnetic disc so as to remove magnetic material deposited around the periphery thereof, as well as protecting the metallic surface thereabout from corrosion, may be performed by a series of interrelated steps which can all be automated to follow one another in a selected sequence. As herebefore described, the disc, after being rotated to reach a selected speed of rotation, is ground by a grinding tool for a selected period of time. Thereafter, the metallic periphery of the disc is covered with a protective liquid which reacts with the metal to protect it from corroding. The reaction lasts for a predetermined set time, at the end of which a neutralizing liquid is deposited onto the periphery of the disc to stop the reaction between the metal and the protective liquid. As a result of stopping the reaction after a selected time period, the color of the disc around the periphery thereof may be controlled so that a color uniformity between discs may be obtained.

Figure 2:
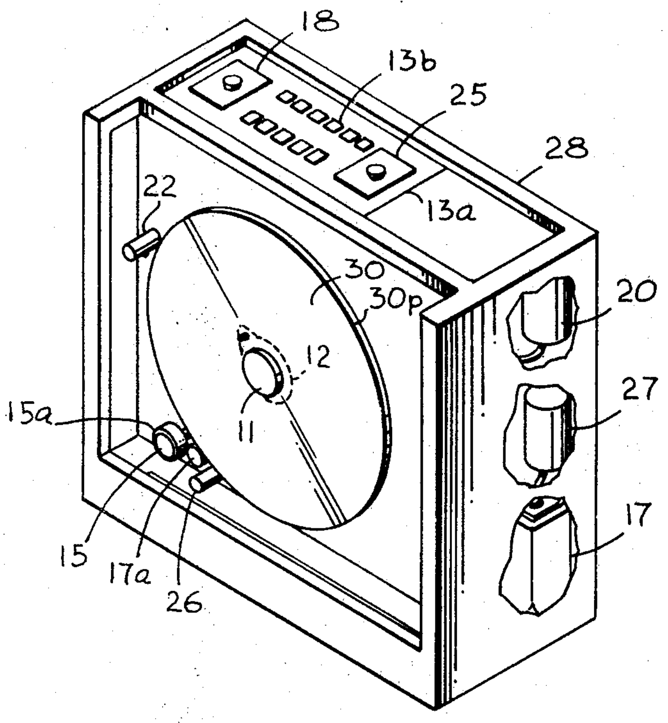
FIG. 2 is an isometric view of the apparatus of the present invention.

Reference is now made to FIG. 2 which is an isometric view of an apparatus constructed in accordance with the teachings of the present invention. As seen therein, the apparatus comprises a housing 28 in which the vacuum system 17, and containers 20 and 27, containing the protective liquid and the neutralizing liquid respectively, are mounted. Also, the master edging control circuit 13 is mounted in a control compartment 13*a* which is in turn housed within the housing with a plurality of switches 13*b* on top of the compartment 13*a*, so that an operator may control the operation of the apparatus.

Timers 18 and 25 are mounted adjacent switches 13*b* so that an operator may conveniently set the timers as well as observe the times elapsed for any of the cycles of operation. A portion of the disc drive assembly 11 protrudes through one side of the housing 28 so that a metallic disc 30, having a periphery 30*p*, may be coupled to the assembly 11 at the center thereof. Nozzles 22 and 26 and a grinding tool 15*a* coupled to the grinding assembly 15 as well as an opening 17*a* of the vacuum system 17, are mounted adjacent the periphery of the disc. Thus, by actuating a particular switch 13*b*, the edging and protection of the disc may be automatically performed.

The disc is first caused to rotate and at a predetermined time thereafter, the grinding tool 15*a* is brought into contact with the periphery 30*p* to grind off any material deposited thereon. After a predetermined grinding period, the grinding tool 15*a* is decoupled from the disc 30 and protective liquid is forced through the nozzle 22 to be deposited on the metallic periphery of the disc 30. The protective liquid is supplied for another predetermined time period during which the liquid reacts with the metallic surface of the disc so as to protect it from adverse effects. After the predetermined period of reaction, neutralizing liquid, such as water, is forced out of the rinse nozzle 26 to neutralize the reaction and stop it to control the final color which the metallic edge of the disc obtains.

There has accordingly been shown and described a novel and useful apparatus for automatically controlling the peripheral characteristics of metallic discs coated with magnetic material. The peripheries of such discs are first ground to remove any magnetic material coated thereon and thereafter, the metal is protected by depositing a protective liquid on the periphery of the metal with which the metal reacts during a controlled time period. It is to be appreciated that those familiar with the art may make modifications and equivalents in the arrangements as shown without departing from the true spirit of the invention. Therefore, all such modifications and equivalents are deemed to fall within the scope of the invention as claimed in the appended claim.

What is claimed is:

1. An apparatus, of the type useful in the manufacturing of a magnetic disc having a center made of metal with magnetic material coated on the metal, for removing the magnetic material deposited on the periphery of the disc and for treating the metal with a protective liquid to prevent corrosion thereof comprising a disc drive assembly including a motor and mean for coupling said disc thereto; control means for controllably energizing said disc drive assembly to rotate about the center thereof; a grinding assembly including a grinding tool energizable by said control means to position said grinding tool in contact with the periphery of said rotating disc to grind magnetic material off the periphery of said disc; a vacuum system for removing the magnetic material ground off the periphery of said disc; a first timer preset to limit the grinding of the periphery of said disc to a first time period; nozzle means mounted adjacent the periphery of said disc responsive to said first timer for depositing a protective liquid on the periphery of said disc after the end of said first time period for impregnating the metal about the periphery of said disc with said liquid; a second timer for controlling said nozzle means to limit the supply of liquid to the periphery of said disc to a second preset time period; and neutralizing means including a rinse nozzle positioned adjacent the periphery of said disc responsive to said second timer at the end of said second preset time period for applying the periphery with a neutralizing liquid, to control the color of the metal about the periphery of said disc.

References Cited

UNITED STATES PATENTS

| | | | |
|---|---|---|---|
| 2,913,246 | 11/1959 | Hagopian | 117—236 X |
| 2,966,881 | 1/1961 | Enssle | 118—7 X |
| 2,977,244 | 3/1961 | Kay et al. | 117—105.5 X |
| 3,216,854 | 11/1965 | Haluerstadt et al. | 118—50 X |

ALFRED L. LEAVITT, Primary Examiner

W. E. BALL, Assistant Examiner

U.S. Cl. X.R.

51—103; 117—43, 105.4; 118—9, 35, 320